Patented Feb. 13, 1940

2,190,179

UNITED STATES PATENT OFFICE 2,190,179

CONVERSION PRODUCTS OF CONSTITUENTS OF CAROB BEANS

Walter Ziese and Friedrich Ebel, Mannheim, and Alwin Schneevoigt, Ludwigshafen - on - the-Rhine, Germany, assignors to I. G. Farbenindustrie Aktiengesellschaft, Frankfort-on-the-Main, Germany No Drawing. Application May 21, 1938, Serial No. 209,392. In Germany May 25, 1937

2 Claims. (Cl. 260—112)

The present invention relates to a process for producing valuable conversion products of constituents of carob beans.

We have found that valuable watersoluble substances are obtained by treating carob bean kernels or their perisperms with alkylating agents.

The carob bean kernels or their perisperms are preferably used in the form of meal or as a decoction. As alkylating agent it is preferable to use alkylene oxides. Other alkylating agents, may, however, also be used, as for example dialkyl sulphates or diazomethane. The treatment with the said agents is advantageously effected in the presence of alkali. It is preferable to proceed by making carob bean kernel meal into a paste with water in a kneading machine, rendering the paste alkaline and then adding an alkylene oxide as such or in aqueous solution. The alkylene oxide may, however, be used in the gas form and led under pressure into a suspension or decoction of the carob bean kernel meal. The mass is then thoroughly kneaded for a long time, if necessary while heating, neutralized and dried for example on a roller dryer under reduced pressure. Too strong a heating is thus avoided.

The amount of alkali used during the reaction, if any, should not be too great. For example it is advantageous to work in the presence of from 0.1 to 0.5 per cent of alkali with reference to the paste used. In this way too great a content of inorganic salts in the final product, which is somewhat troublesome for later uses, is avoided. Salts of the said kind may if necessary be removed before the said drying of the resulting paste by precipitation or extraction with solvents or by dialysis. If it is desired to obtain final products free from salts in the first instance, the alkylene oxide is allowed to act on the aqueous suspension of carob bean kernel meal without the simultaneous use of alkali; the reaction, however, is usually more prolonged in this case and therefore working under pressure is usually necessary. Similarly without the addition of alkali, the treatment may be carried out with diazomethane, a solution of diazomethane in ether being allowed to act on the carob bean kernel meal. When using dialkyl sulphates, however, an addition of alkali is preferable.

The substances obtainable according to the process of this invention are excellent dressing and sizing agents. They may furthermore be used with advantage as thickening agents for the purpose of printing pastes.

The following examples will further illustrate how the present invention is carried out in practice but the invention is not restricted to these examples. The parts are by weight if not otherwise stated.

Example 1

12 parts of carob bean kernel meal are suspended in 280 parts of water and the said suspension is stirred powerfully until a thick paste has been formed. While continuing the strong stirring, 28 parts of 5 per cent caustic soda solution and 13 parts of propylene oxide are added. After well mixing, the resulting mass is allowed to stand for about 2 days, neutralized with dilute hydrochloric acid and evaporated to dryness by quite gentle heating under reduced pressure. The mass obtained is comminuted into coarse pieces or ground. It gives excellent stable aqueous solutions which are suitable for example as a sizing agent.

A similar final product is obtained by using the corresponding amount (9.85 parts) of ethylene oxide instead of propylene oxide.

The procedure may also be by adding to the paste treated with propylene oxide an equal volume of alcohol, washing the precipitate with alcohol containing less and less water and finally drying in the air.

Example 2

40 parts of carob bean kernel meal are made into a paste with 1200 parts of water in a ball mill, 120 parts of 10 per cent caustic soda solution and 25 parts of dimethyl sulphate being added. The mixture is ground for 15 hours. 120 parts of 10 per cent caustic soda and 25 parts of dimethyl sulphate are added, the whole ground for another 15 hours and then the amount of hydrochloric acid necessary for neutralization is added and the same volume of alcohol. The precipitate is washed with alcohol and dried. When made into a paste with water it yields a stable solution.

Example 3

1000 parts of carob bean kernel meal are ground in a ball mill while slowly adding 50 parts of 50 per cent potassium hydroxide solution. The resulting mass is then further treated in the mill while adding 100 parts of propylene oxide. After 5 hours further 100 parts of propylene oxide are added and the mass is further well ground for 10 hours. It is then freed from alkali by acting thereon with gaseous hydrogen chloride in such an amount that the alkali present is just neutralized. The product is dried at the open air.

Example 4

10 parts of carob bean kernel meal are mixed with a solution of diazomethane in 60 parts of ether. The said solution is prepared by adding 10 parts of nitrosomethyl urea at 0° C. in portions while shaking to 30 parts by volume of 40 per cent potassium hydroxide solution and 100 parts by volume of ether. The mixture of the carob bean meal with the dry solution of diazo methane mentioned above is then allowed to stand for 3 hours while cooling. The solution is then no longer yellow. The product is then filtered off and dried.

Example 5

A mixture of 100 parts of carob bean kernel meal and 5 parts of 50 per cent potassium hydroxide solution, treated in the manner described in Example 3, is mixed with 100 parts of methanol and 10 parts of propylenechlorhydrine, heated to boiling for 2 hours under reflux. The product is then filtered off and dried in the open air.

Instead of propylenechlorhydrine 8.5 parts of ethylenechlorhydrine may be used giving a similar product.

Example 6

75 grams of Indanthrene Blue GCD double paste fine (Schultz, Farbstofftabellen, 7th edition, No. 1234) are made into a paste with 700 grams of a 3 to 5 per cent aqueous solution of one of the substances referred to in the second paragraph of Example 1, 120 grams of potash, 80 grams of the sodium salt of hydroxymethanesulphinic acid and 80 grams of glycerine. The paste thus formed is then made up with another thickening agent to form a total of 1000 grams. The paste is then imprinted on a fabric of vegetable fibers, whereupon the fabric is dried, treated for 5 minutes in a steamer of the Mather-Platt type, rinsed, soaped while boiling, rinsed and dried. Thus a vivid blue is obtained which has an excellent fastness to washing, rubbing and light. The said paste can also be mixed in any ratio with any other thickening agent stable to alkali, such as starch or British gum.

Example 7

100 grams of Indanthrene Brilliant Green B paste fine concentrated (Schultz, Farbstofftabellen, 7th edition, No. 1269) are made into a paste with 900 grams of a 3 to 5 per cent solution of one of the substances referred to in Example 1 and imprinted on a fabric of vegetable fibers. After printing the fabric is passed through a bath of caustic soda solution and of the solution of the sodium salt of hydroxymethanesulphinic acid, steamed, rinsed, soaped while boiling, rinsed again and dried. Thus a vivid green is obtained which has a good fastness to washing, rubbing and light.

Example 8

120 grams of Indanthrene Brilliant Rose R paste (Schultz, Farbstofftabellen, 7th edition, No. 1345) are made into a paste with 520 grams of a 3 to 5 per cent aqueous solution of one of the substances obtainable according to Example 1, 80 grams of potash, 100 grams of the sodium salt of hydroxymethanesulphinic acid and 80 grams of glycerine. The paste is made up by means of water or another thickening agent to form a total of 1000 grams and applied in the manner described in Example 6. The resulting prints have a vivid rose color and an excellent fastness to washing, rubbing and light.

Example 9

50 grams of Rapidogen Red G (Schultz, Farbstofftabellen, 7th edition, Vol. II, page 181), 30 grams of Monopol Brilliant Oil and 30 grams of a 32 to 33 per cent caustic soda solution are dissolved in 42 grams of water and are added at 50° C. to 650 grams of a 3 to 5 per cent solution of one of the substances mentioned in Example 1. The paste thus obtained is imprinted on vegetable fibers, whereupon the fabric is dried, treated for from 5 to 10 minutes in a steamer of the Mather-Platt type with the vapors of acetic acid and formic acid, rinsed, soaped while boiling, rinsed and dried. A vivid red coloration is obtained which has a good fastness to washing, rubbing and light.

What we claim is:

1. An alkylation product of carob bean kernel meal.

2. A polyethyleneglycol ether of carob bean kernel meal.

WALTER ZIESE.
FRIEDRICH EBEL.
ALWIN SCHNEEVOIGT.